No. 640,772. Patented Jan. 9, 1900.
A. J. KAUFFMAN.
FENCE MACHINE.
(Application filed Mar. 30, 1899.)
(No Model.)
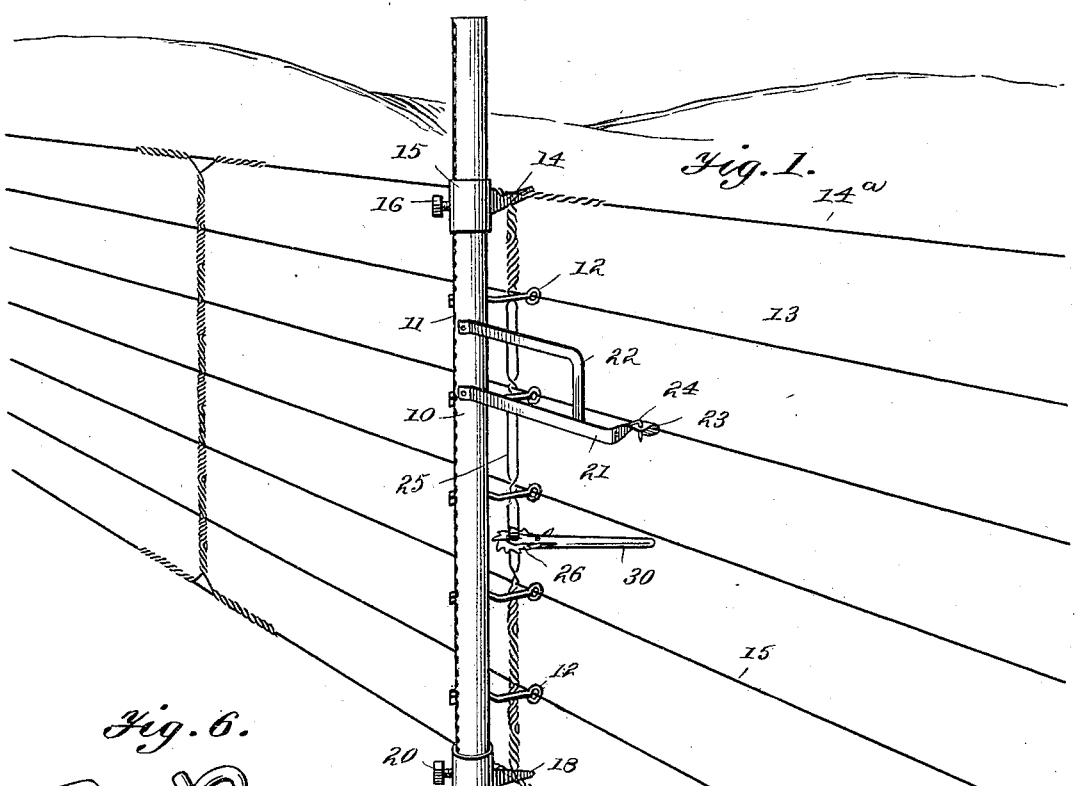

UNITED STATES PATENT OFFICE.

AMOS J. KAUFFMAN, OF GAP, PENNSYLVANIA.

FENCE-MACHINE.

SPECIFICATION forming part of Letters Patent No. 640,772, dated January 9, 1900.

Application filed March 30, 1899. Serial No. 711,076. (No model.)

*To all whom it may concern:*

Be it known that I, AMOS J. KAUFFMAN, a citizen of the United States, residing at Gap, in the county of Lancaster and State of Pennsylvania, have invented a new and useful Fence-Machine, of which the following is a specification.

My invention relates to fence-machines, and has for its object to provide an improved and simplified machine for securing wire-cable stays in wire fences.

The invention consists also in certain details of construction, novelties of combination, and arrangement of parts, all of which will be fully described hereinafter and pointed out in the appended claim.

In the drawings forming part of this specification, Figure 1 is a perspective view illustrating a machine constructed in accordance with my invention in position upon a fence for practical operation. Fig. 2 is a top plan view, on an enlarged scale, of the ratchet devices for twisting the stays. Fig. 3 is a detail sectional view on the plane indicated by the dotted line 3 3 of Fig. 2. Fig. 4 is a detail perspective view of the ratchet-wheel detached. Fig. 5 is a detail perspective view of the central block of the ratchet-wheel detached. Fig. 6 is a detail perspective view of one of the wire-supporting hooks detached.

Like numerals of reference mark the same parts wherever they occur in the various figures of the drawings.

Referring to the drawings by numerals, 10 indicates a section of gas-pipe of which I usually form the upright of my machine. This upright is perforated, two series of holes 11 being arranged in vertical lines diametrically opposite to each other, the holes being about an inch, or thereabout, apart. In these holes I place open hooks 12 in number and position to correspond with the line-wires of the fence to be stayed, except the top and bottom wires, five hooks 12 being herein shown to receive the five wires 13, the top wire 14ª being rested upon the top of the arm 14, projecting from a sleeve 15, adjustably secured on the upright 10 by a set-screw 16, and the bottom wire 17 passing under a like arm 18, secured in a similar manner on a sleeve 19, adjustably secured on the upright by a set-screw 20. The hooks 12 are bent to project laterally from the upright, so as to engage the wires 13 out of the way of the stay to be secured to the wires directly in line with the upright and the arms 14 and 18, and an arm 21 is secured to the upright in proper position to engage one of the wires at some distance from the upright to steady the machine. The arm 21 is stiffened by an angular brace 22 and is formed at its outer end into a hook 23 to engage over the wire, said hooks being secured against slipping off the wire by a spring-wire latch 24, as shown.

After a double-wire stay 25 is secured to the upper and lower wires, the two strands of the stay passing down on opposite sides of the intermediate wires, it is twisted into capable form by the mechanism now to be described.

26 indicates a ratchet-wheel provided with a square bed 27 in its center, in which is placed a square block 28 of the same thickness as the wheel and provided on each side with a disk or round boss 29, projecting beyond the side of the wheel. A handle 30 has forked flat ends 31 to embrace the wheel 26 and bored to fit over and form bearings for the bosses 29. A ratchet 32 is pivoted to the handle and normally and yieldingly held in engagement therewith by a spring 33. The ratchet-wheel 26, square block 28, bosses 29, and flat ends 31 are each provided with a diametric slot or deep notch, as shown at 34, extending from one edge to and slightly (about the diameter of a strand of stay-wire) past the center. When the stay has been attached, as before explained, these notches are made to register, as in Fig. 2, and are slipped upon the two strands of the stay at a point midway between two wires, the stay-wires being seated in this notch of the block and bosses. The handle is now moved horizontally in the direction of the point of the pawl, carrying the ratchet-wheel, block, and bosses around, and twisting the strands of the stay around each other above and below the twister and between the adjacent line-wires. When the wires of the stay are twisted fully, the twisting mechanism may be slipped off by lifting the pawl out of contact with the teeth of the wheel and bringing the notches of the wheel, block, bosses, and handle into register, as in Fig. 2. As each section of the stay is twisted it fastens itself firmly around the line-wires, affording a firm stiffening and strengthening support therefor.

Having thus fully described my invention, what I claim as new, and desire to secure by Letters Patent of the United States, is—

In a fence-machine, stay-twisting mechanism, comprising a ratchet-wheel with a square central hole, a block fitted in the hole and provided with projecting bosses, a handle having flat forked ends embracing the wheel and receiving the bosses in round holes, a ratchet pivoted to the handle, and a spring pressing its point into engagement with the wheel, the wheel, block, bosses, and flat ends of the handles being slotted, substantially as described.

AMOS J. KAUFFMAN.

Witnesses:
C. L. KAUFFMAN,
J. H. NEUHAUSER.